United States Patent [19]

Mori et al.

[11] Patent Number: 4,959,871

[45] Date of Patent: Sep. 25, 1990

[54] IMAGE INPUT/OUTPUT APPARATUS

[75] Inventors: Akio Mori, Tokyo; Takeshi Aikawa, Chofu, both of Japan; Mitsuo Saito, Arlington, Mass.

[73] Assignee: Kabushiki Kaisha Toshiba, Tokyo, Japan

[21] Appl. No.: 244,595

[22] Filed: Sep. 13, 1988

Related U.S. Application Data

[63] Continuation of Ser. No. 16,995, Feb. 19, 1987, abandoned, which is a continuation of Ser. No. 654,568, Sep. 26, 1984, abandoned.

[30] Foreign Application Priority Data

Sep. 28, 1983 [JP] Japan ............ 58-178135

[51] Int. Cl.[5] ............ G06K 9/22

[52] U.S. Cl. ............ 382/59; 235/472; 358/472; 358/473

[58] Field of Search ............ 382/59; 235/436, 472, 235/474; 101/93.04, 93.14, 103, 123, 288, 327, 368; 358/285, 286, 444, 473, 474, 476, 472

[56] References Cited

U.S. PATENT DOCUMENTS

| | | | |
|---|---|---|---|
| 4,260,979 | 4/1981 | Smith | 382/59 |
| 4,349,730 | 9/1982 | Pfeifer et al. | 235/472 |
| 4,377,741 | 3/1983 | Brekka et al. | 235/472 |
| 4,523,235 | 6/1985 | Rajchman | 358/286 |
| 4,574,317 | 3/1986 | Scheible | 382/59 |
| 4,626,925 | 12/1986 | Toyoda | 358/473 |
| 4,652,937 | 3/1987 | Shimura et al. | 358/286 |
| 4,684,998 | 8/1987 | Tanioka et al. | 358/473 |
| 4,703,186 | 10/1987 | Nakayama et al. | 382/59 |
| 4,707,747 | 11/1987 | Rockwell, III | 358/473 |

FOREIGN PATENT DOCUMENTS

| | | | |
|---|---|---|---|
| 0016400 | 10/1980 | European Pat. Off. | 382/59 |

OTHER PUBLICATIONS

Bantz et al, "Pen-Like Device for Input/Output", Aug.-1979, IBM Technical Disclosure Bulletin, vol. 22, No. 3, pp. 1295-1297.

*Primary Examiner*—David K. Moore
*Assistant Examiner*—Joseph Mancuso
*Attorney, Agent, or Firm*—Banner, Birch, McKie & Beckett

[57] ABSTRACT

A manually movable input/output peripheral device is provided which includes an input/output head or transducer which is manually movable by the user, a guide member which controls the direction of movement of the transducer, and distance measuring device. Data transfer between the transducer and a recording surface is controlled at a rate dependent on the speed which the transducer is moved across the recording surface. Thus, the device is insensitive to variations in operating speed.

9 Claims, 4 Drawing Sheets

IMAGE INPUT/OUTPUT APPARATUS

This application is a continuation of application Ser. No. 016,995, filed Feb. 19, 1987, now abandoned which is a continuation of application Ser. No. 654,568, filed Sept. 26, 1984, now abandoned.

BACKGROUND OF THE INVENTION

The present invention relates to the field of image input/output peripheral devices and, more particularly, is directed to an improved device which is highly portable.

A number of peripheral devices are presently known in the prior art for printing image patterns such as characters and graphical information. Such devices include dot matrix printers, fully formed character printers and the like. These printers are, in most cases, designed to print on standard recording paper. A problem is presented, however, where printing is required on a non-standard recording surface such as small and large size paper, an open page of a notebook or the surface of a wall or box. Moreover, in conventional printers, it is not readily possible to change the direction that the recording paper feeds through the printer. Thus, it is difficult to print characters in more than one orientation on the recording paper without special, and often complicated, control circuitry. It is also difficult to print undistorted images on the recording paper on an incline with respect to the normal direction of paper feed through the printer.

A number of peripheral devices are also known in the art for reading image patterns, such as characters and graphical information, and providing the read data to, for example, a computer system for processing and storage. Among these devices are moveable hand scanners for reading coded images. One example of a conventional hand scanner is the well known bar code reader used to read coded information from a series of spaced bars. Another example is the OCR scanner often used to read sales tickets in large stores. Data produced by the scanner is supplied to an image recognition device for recognizing the particular character or pattern. A further example of a moveable scanner is the "self-running facsimile scanner disclosed at pages 17-19 of the Journal of the Institute of Image Electronic Engineers of Japan, Vol. 8, No. 1. This scanner includes an electric motor which moves an image sensor at a uniform speed over a desired image.

Conventional scanning input devices, such as those described above, have many of the same drawbacks and deficiencies as conventional output devices also described above. One of the chief deficiencies of movable hand scanners is that they must be moved at a constant scanning speed to achieve reliable results. Hand operated bar code readers, in particular, are notoriously well known for their sensitivity to variations in scanning speed. It has proved difficult for users to learn the required technique for efficient and reliable use of such devices.

SUMMARY OF THE INVENTION

It is, therefore, the overall object of the present invention to provide an improved input/output peripheral device which is capable of printing or scanning an image by manual operation by the user.

It is another object of the present invention to provide an improved input/output peripheral device which is capable of printing or scanning an image on a variety of surfaces regardless of thickness, size or location.

It is a still further object of the present invention to provide an improved input/output peripheral device which is capable of producing a precise reproduction of an image uneffected by variations in operating speed caused by manual operation.

It is a still further object of the present invention to provide an improved input/output peripheral device which is substantially insensitive to variations in operating speed.

In a first embodiment of the present invention, a peripheral device is disclosed which includes a print head as a transducer for printing a line of data for an image or a series of characters on a recording surface, a guide member to regulate the direction of movement of the print head; a measuring device which measures the distance traversed by the print head; and control means for controlling the printing rate of the print head as a function of the moving speed of the print head. The guide member is preferably a rotating member, such as a roller or wheel, which has its rotating axis in parallel with the line direction of the image to be printed so as to always guide the movement of the print head in a direction perpendicular to the line direction.

In a second embodiment of the invention, an image input device device is provided as a transducer which includes a line sensor for scanning a pre-recorded image on a recording surface and obtaining image data; a guide member which regulates the direction of movement of the line sensor; and a measuring device which indicates the rate of movement of the line sensor and provides signals to a control unit for controlling the reading rate of the line sensor as a function of its rate of movement.

Because the rate of transfer of data between the print head or line sensor and the recording surface is a function of the rate of movement of the peripheral device across the recording surface, reliable results are achieved without regard to maintaining a constant speed. Thus, the peripheral device of the present invention is substantially insensitive to speed variations.

Further objects, features and other aspects of the present invention will be understood from the detailed description of the preferred embodiment of the invention with reference to the annexed drawings.

DESCRIPTION OF THE PREFERRED EMBODIMENT

Figure 1:
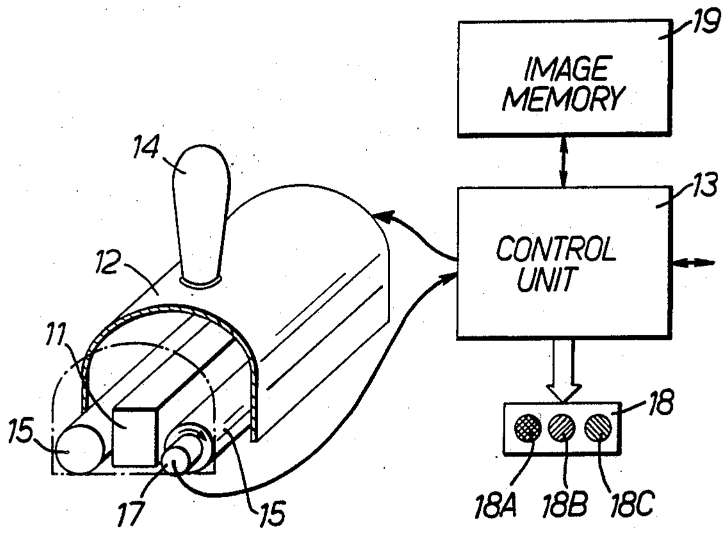
FIG. 1 is a prospective view of one embodiment of a peripheral device in accordance with the present invention showing a portable printer.
Figure 2:
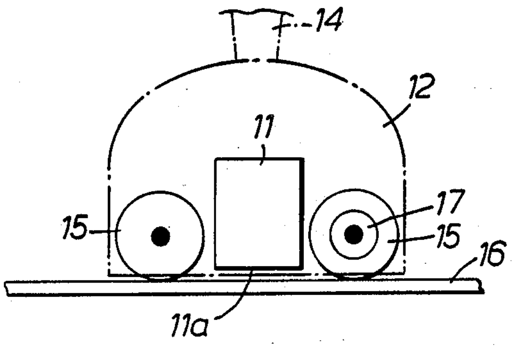
FIG. 2 is an end view of the peripheral device illustrated in FIG. 1.

With reference to FIGS. 1 and 2, a peripheral device is shown having a print head for printing an image on recording paper 16. Print head 11 may be of the same type as used in a conventional thermal transfer printer having a plurality of printing electrodes (not shown) arranged in a line. Each of the printing electrodes produces a dot on the recording paper corresponding to a respective location on the image. Print head 11 is installed in housing 12 with printing surface 11*a* positioned slightly above the lower edge of the housing. Print head 11 is electrically connected to control unit 13 which comprises a microcomputer to control the printing signals supplied to print head 11.

Handle 14 is fixed at the top of the housing 12 and can be easily grasped by the user to move the device across the recording paper. At both sides of print head 11 there are arranged a pair of elongated rollers 15 whose rotating axis are in parallel with the line printing direction of the print head 11. Rollers 15 can rotate freely when the user applies force to handle 14. Rollers 15 serve as a guide member to always guide the movement of print head 11 in a direction perpendicular to the line direction.

Rotary encoder 17 is attached to one of the rollers 15. Encoder 17 produces a pulse (hereinafter "a control pulse") each time rollers 15 rotates to a predetermined angular amount. These control pulses are supplied to control unit 13.

Display device 18 is provided for indicating the speed of print head 11. Display device 18 includes three light emitting diodes (LED) which may be colored green, yellow and red, respectively.

Figure 3:
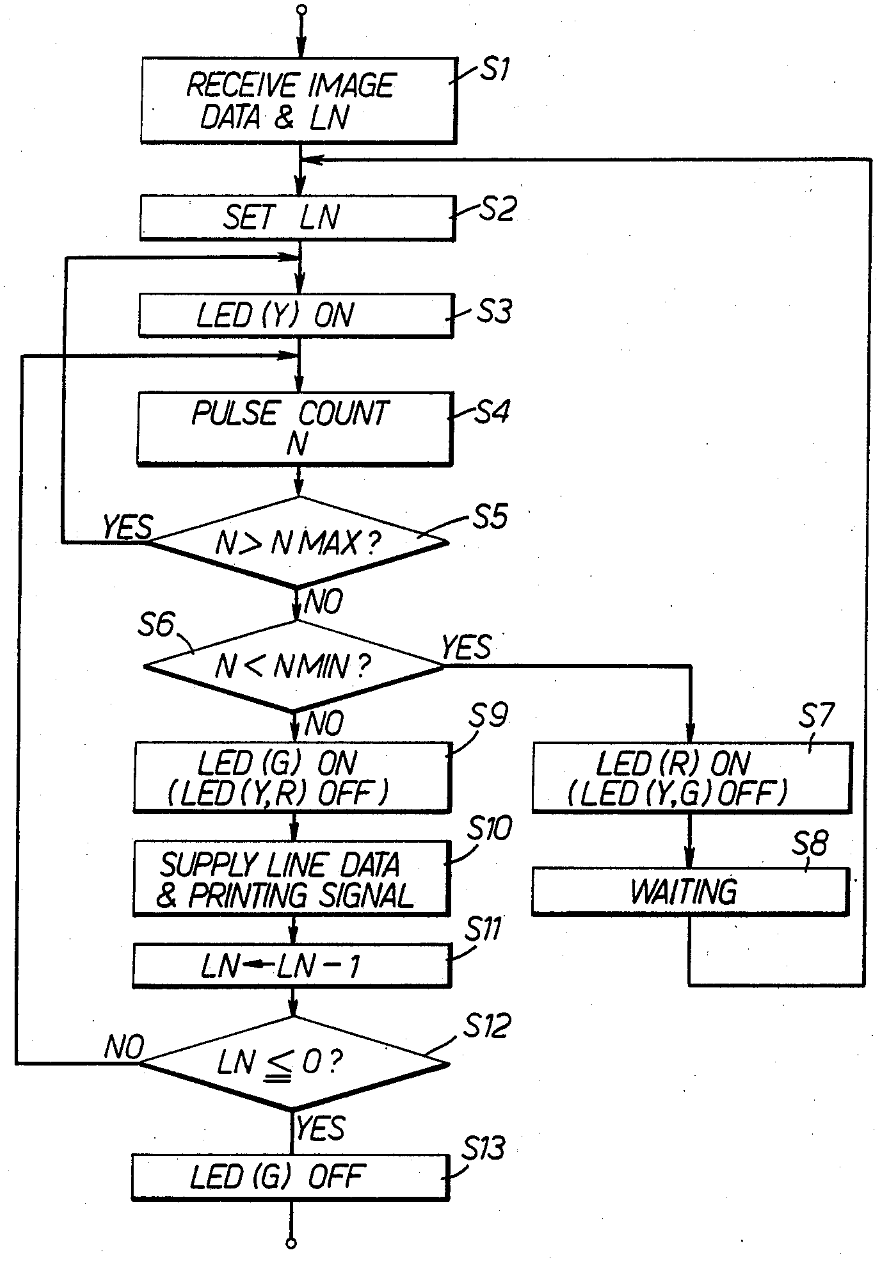
FIG. 3 is a flowchart showing the operation of the peripheral device illustrated in FIG. 1.

FIG. 3 is a flowchart showing the operations of control unit 13. In step 1, control unit 13 receives image data from, for example, a computer to be printed on recording paper 16 and a line number LN indicating the number of lines comprising the image. In step 2, line number LN is stored in a line counter. In step 3, yellow LED 18A is turned on indicating that the printer is ready for printing. The user then can manually move the device across the recording paper. As the device is moved, encoder 17 supplies control pulses to control unit 13. In step 4, a control unit 13 monitors the moving speed of print head 11 by counting the number N of clock pulses from a reference clock during the interval between successive control pulses from encoder 17. Number N is inversely proportioned to the speed of print head 11. Where N is small, speed is fast and N is large, speed is low. Accordingly, when print head 11 is stationary, N is infinitely large.

In step 5, N is compared with a predetermined maximum NMAX. When N is greater than NMAX, control unit 13 determines that print head 11 is substantially stationary and loops back to step 3. In step 6, N is compared to a predetermined minimum NMIM. When N is less than NMIM, control unit 13 determined that print head 11 is moving too fast for reliable printing in step 7 and turns on red LED 18C to warn the user that the device has stopped printing. Control unit 13 then enters a wait state in step 8 then returns to step 2. If N is greater than NMIM, green LED 18B is turned on in step 9 indicating that print head 11 is moving in a sufficient speed range to permit reliable printing. In step 10, control unit 13 supplies the data to print head 11 for printing the line and a signal to print. In step 11, the line counter is decrement by 1. In step 12, the value in the line counter is compared to 0 to determine if the image is completely printed. If not, control unit 13 loops back to step 4 for printing the next line. If the image is completed, however, green LED 18B is turned off indicating that the print operation is complete.

The direction of movement of print head 11 is controlled by rollers 15 so that an undistorted image may be printed. Also, variations or changes in speed by the user do not affect the printed image. This is accomplished by changing the timing of the control signals to print head 11 in accordance with the change in the interval between control pulses generated by encoder 17 and by displaying to the user the proper speed range.

A plurality of wheels may also be used in place of rollers 15 and print head 11 may have a plurality of lines of printing electrodes in order to print a plurality of lines at the same time.

Figure 4:
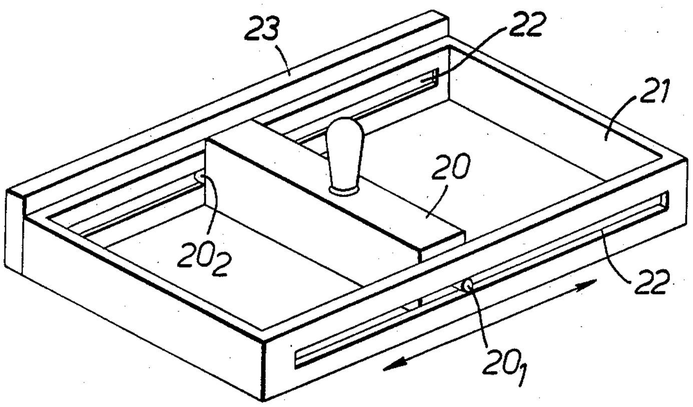
FIG. 4 is a perspective view of another embodiment of a peripheral device in accordance with the present invention.

FIG. 4 illustrates another embodiment of the present invention. Body 20 is the same as shown in FIG. 2 except that the rollers 15 and encoder 17 are removed. Body 20 has a pair of projections 201, 202 in its longitudinal direction. Frame 21 is provided for guiding the direction of movement of body 20. Frame 21 has a pair of slots 22 which receive projections 201, 202 so that print head 11 may move freely along slots 22. Position sensor 23 is provided for measuring the position of projection 202 along the side of the frame 21. Position sensor 23 provides a series of control pulses to a control unit (not shown) as print head 11 is moved along slots 22 during a print operation. The control unit controls the rate of printing as described above with respect to the flow chart shown in FIG. 3.

Figure 5:
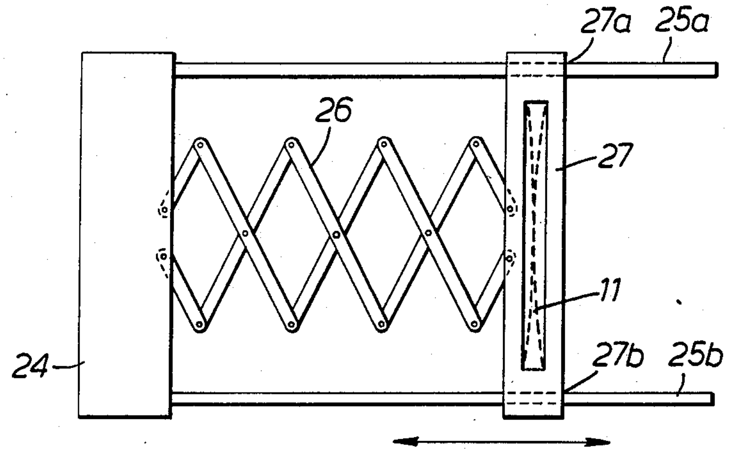
FIG. 5 is a side view of a further embodiment of a peripheral device in accordance with the present invention showing an image reader.

FIG. 5 illustrates another embodiment of the present invention. A pair of guide rods 25*a*, 25*b* is provided for guiding the direction of movement of print body 27. Guide rods 25*a*, 25*b* are fixed to base member 24, arranged parallel to each other. Print body 27 has print head 11 and a pair of holes 27*a*, 27*b* through which the pair of guiding rods 25*a*, 25*b* are inserted so as to permit print body 27 to freely move along the longitudinal direction of the guide rods. Print body 27 and base member 24 are connected by link mechanism 26 which is similar to a pantograph, for supporting the movement of print body 27. The position of print body 27 is measured by, for example, a rotary encoder (not shown) provided in base member 24 and driven by a rope or dial cord (not shown).

In the present invention, it is noted that other methods and encoding devices may be used for determining the speed that the print head is moved across the recording paper. Such methods and devices include the following:

(1) detecting the sound produced by the recording paper as the print head moves across it and converting it to moving speed by an A/D converter;

(2) detecting acceleration of the print head by an acceleration sensor and integrating the output of the sensor; and (3) using a position sensing surface under the recording paper (pressure sensitive type or magnetostriction type) to indicate the position of the print head.

Figure 6:
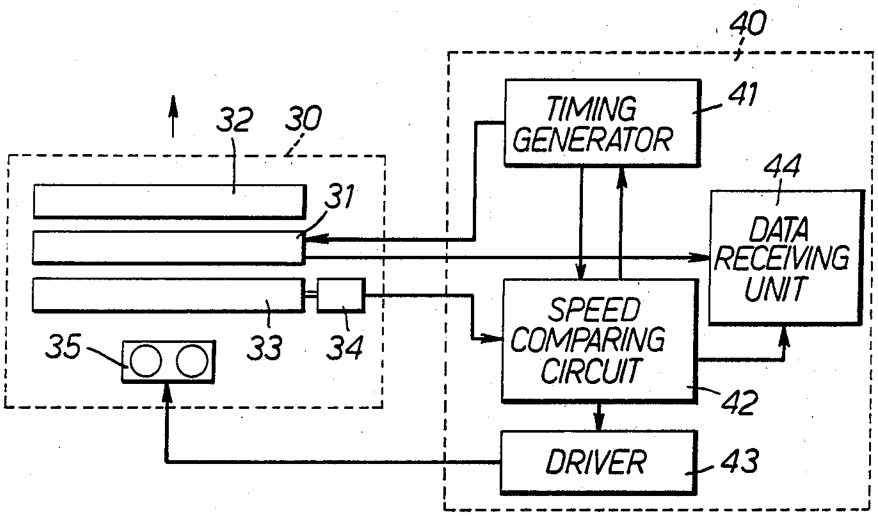
FIG. 6 shows a block diagram of a portable image reader as the other embodiment of the invention.

FIG. 6 is a block diagram of a further embodiment of the peripheral device in accordance with the present invention. In this embodiment, the print head is replaced by an image reader which is used to scan and read a pre-recorded image on the recording paper. The reader includes reading body 30 and control unit 40.

Reading body 30 has CCD (charge coupled device) line sensor 31 for scanning an image on the recording paper, a pair of rollers 32, 33 being parallel to each other, rotary encoder 34 for generating control signals corresponding to the rotation of roller 33, and indicator 35 having a red LED and a green LED. Control unit 40 includes a timing generator 41, speed comparing circuit 42, driver 43 for driving indicator 35 and data receiving unit 44 for storing the read data.

Figure 7:
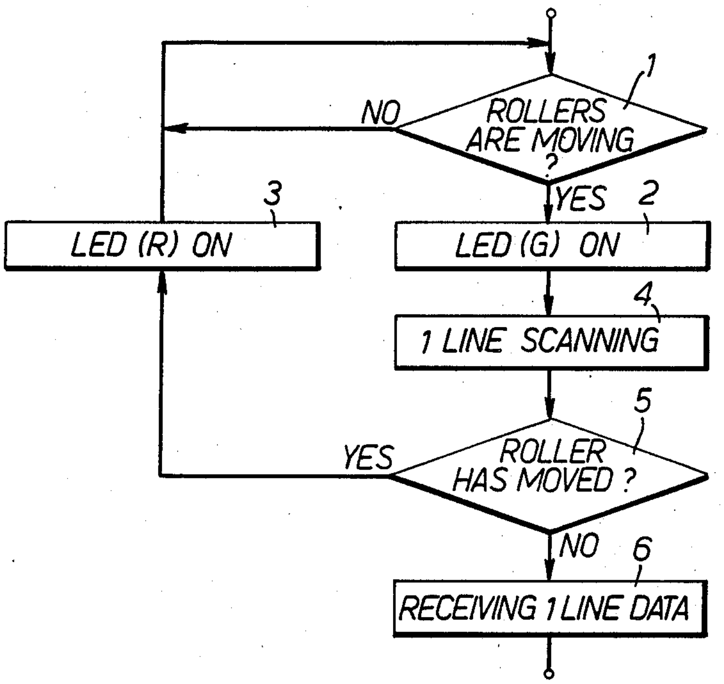
FIG. 7 is a flowchart showing the operation of the peripheral device illustrated in FIG. 6.

FIG. 7 is a flowchart showing the operation of the reader of FIG. 6 reading one line of data of an image pre-recorded on the recording paper. In step 1, speed comparing circuit 42 is waiting to receive a control signal from encoder 34 indicating that line sensor 31 has moved a predetermined distance in a direction controlled by rollers 32, 33. When the control signal is received, speed comparing circuit 42 supplies a driving signal to driver 43 turning on the green LED and also supplies a pulse to timing generator 41 (step 2). In step 4, timing generator 41 supplies a scanning pulse to line sensor 31 so as to scan the image and produce one line of data from the image. In step 5 speed comparing circuit 42 checks whether roller 33 has moved during the line scanning period. If roller 33 has not moved, speed comparing circuit 42 supplies a receiving pulse to data receiving unit 44. The data receiving unit stores the line data in an image memory (not shown) only when the receiving pulse is received. When roller 33 has moved during the line scanning period, speed comparing circuit 42 supplies a driving pulse to the red LED of speed indicator 35 indicating that the reader should be moved to the next line. A receiving pulse, however, is not supplied to data receiving unit 44. In this embodiment of the invention, the red LED is turned when the reader is moved across the recording paper at, for example, 80% of its reliable moving speed.

According to the portable image reader of the invention, any image data can be obtained by scanning them manually with the reading body 30. And, a clearer image data is obtained regardless of changes in moving speed.

The present invention has been described in detail in connection with a preferred embodiment. The embodiment, however, is merely an example and the invention is not restricted thereto. It will be understood by those skilled in the art from a reading of the specification that variations and modification can be made within the scope of the present invention as defined by the appended claims.

We claim:

1. In a hand operated image output device which can be manually moved across a recording surface in order to transfer image data to said surface in a plurality of sequential image lines, a method of transferring said image data to said recording surface, said method comprising the steps of:

(a) determining the number of lines which form said image data and storing the value of said number in a line counter;

(b) manually moving said image output device across said recording surface;

(c) generating a plurality of control pulses in accordance with the movement of said image output device;

(d) providing a reference clock signal and counting the number of clock pulses occurring between successive said control pulses;

(e) comparing said number of clock pulses with a predetermined maximum value and repeating step (d) while said number of clock pulses is greater than said predetermined maximum value;

(f) comparing said number of clock pulses with a predetermined minimum value and repeating at least one of steps (a)-(e) while said number of clock pulses is less than said predetermined minimum value;

(g) printing an image line of data on said recording surface;

(h) decreasing the value stored in said line counter; and (i) repeating steps (b)-(h) until the value stored in said line counter is zero.

2. The method of claim 1 further comprising the step of indicating a relative speed of said output device across said surface according to results of the comparison steps.

3. The method of claim 2 wherein said step of indicating the relative speed includes the step of illuminating a plurality of LEDs dependent on the speed of said output device.

4. A hand operated printing device which can be manually moved across a recording surface, said device comprising:

handle means for grasping by a user to move said device across said recording surface;

memory means coupled to said handle means for storing image data to be printed on said recording surface;

a print head for printing an image onto said recording surface;

distance measuring means for measuring increments of distance as said device is moved across said recording surface and producing a distance signal for each of said increments;

clock pulse generating means for generating clock pulses;

counting means for counting said clock pulses between the intervals of said distance signals generated by said distance measuring means to determine the speed of the device;

comparing means coupled to said counting means for comparing the number of clock pulses counted by said counting means with predetermined data to determine if the speed of the device is inside or outside of a predetermined range;

control means coupled to said memory means, said print head and said comparing means, for supplying the image data to said print head only when the speed of the device is inside of the predetermined range; and speed indicating means coupled to said comparing means for indicating whether the device is being moved across said recording surface at a speed inside or outside of the predetermined range.

5. A hand operated printing device according to claim 4 wherein said speed indicating means includes:

first indicating means for indicating with first colored light when the device is being moved across said recording surface at a speed within the predetermined range; and second indicating means for indicating with second colored light when the device is being moved across said recording surface at a speed outside of the predetermined range.

6. A hand operated printing device according to claim 4, wherein said speed indicating means includes:

first indicating means for indicating with first colored light when the device is being moved across said recording surface at a speed within the predetermined range;

second indicating means for indicating with second colored light when the device is being moved across said recording surface at a speed above the predetermined range; and third indicating means for indicating with third colored light when the device is being moved across said recording surface at a speed below the predetermined range.

7. A hand operated printing device which can be manually moved across a recording surface, said device comprising:

handle means for grasping by a user to move said device across said recording surface;

memory means coupled to said handle means for storing image data to be printed on said recording surface;

a print head for printing an image onto said recording surface;

distance measuring means for measuring increments of distance as said device is moved across said recording surface and producing a distance signal for each of said increments;

clock pulse generating means for generating clock pulses;

counting means for counting said clock pulses between the intervals of said distance signals generated by said distance measuring means to determine the speed of the device;

comparing means coupled to said counting means for comparing the number of clock pulses counted by said counting means with predetermined data to determine if the speed of the device is within a predetermined range;

control means coupled to said memory means, said print head and said comparing means, for supplying the image data to said print head only when the speed of the device is within the predetermined range;

a display coupled to said comparing means for displaying the state of said device when the device is being moved across said recording surface at a speed within the predetermined range; and means for stopping the displaying by said display when there is no image data left in said memory means.

8. In a hand operated image output device which can be manually moved across a recording surface in order to transfer image data to said surface in a plurality of sequential image lines, a method of transferring said image data to said recording surface, said method comprising the steps of:

(a) determining the number of lines which form said image data and storing the value of said number in a line counter;

(b) manually moving said image output device across said recording surface;

(c) generating a plurality of control pulses in accordance with the movement of said image output device;

(d) providing a reference clock signal and counting the number of clock pulses occurring between successive said control pulses;

(e) comparing said number of clock pulses with a predetermined maximum value and repeating step (d) while said number of clock pulses is greater than said predetermined maximum value;

(f) comparing said number of clock pulses with a predetermined minimum value, indicating a relative speed of said output device across said surface according to the comparison result and repeating at least one of steps (a)-(e) while said number of clock pulses is less than said predetermined minimum value;

(g) printing an image line of data on said recording surface;

(h) decreasing the value stored in said line counter; and (i) repeating steps (b)-(h) until the value stored in said line counter is zero.

9. The method of claim 8 wherein said step of indicating the relative speed includes the step of illuminating a plurality of LEDs dependent on the speed of said output device.

* * * * *